(12) United States Patent
Dodelet et al.

(10) Patent No.: US 6,887,451 B2
(45) Date of Patent: May 3, 2005

(54) PROCESS FOR PREPARING CARBON NANOTUBES

(75) Inventors: Jean Pol Dodelet, Ste-Julie (CA);
Xuellang Sun, Longueuil (CA);
Sylvain Desilets, St-Augustin (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 380 days.

(21) Appl. No.: 10/134,450

(22) Filed: Apr. 30, 2002

(65) Prior Publication Data

US 2003/0202930 A1 Oct. 30, 2003

(51) Int. Cl.$^7$ .................................................. D01F 9/12
(52) U.S. Cl. ..................................................... 423/447.3
(58) Field of Search ....................................... 423/447.3

(56) References Cited

PUBLICATIONS

Cassell et al., 'Directed Growth of Free–Standing Single–Walled Carbon Nanotubes' in JACS vol. 121 pp. 7975–7976 (1999).*

* cited by examiner

*Primary Examiner*—Stuart Hendrickson
(74) *Attorney, Agent, or Firm*—George A. Seaby

(57) ABSTRACT

Carbon nanotubes are produced using a silane procedure, in which a substrate such as carbon paper or stainless steel mesh is immersed in a silane solution of a metal catalyst, preferable Co:Ni in a 1:1 ratio; and a feedstock gas containing a carbon source such as ethylene is fed through the substrate and the catalyst deposited thereon while the substrate is heated by applying an electrical current thereto. Thus, a reaction occurs between the catalyst and the gas to yield carbon nanotubes supported on the conductive substrate. These composite electrodes may be used in electrochemistry or in field emitting applications.

15 Claims, 5 Drawing Sheets

Ar + H₂ + Hydrocarbon

PROCESS FOR PREPARING CARBON NANOTUBES

BACKGROUND OF THE INVENTION

1. Field of the Invention

This invention relates to a process for producing carbon nanotubes.

During the last ten years or so, carbon nanotubes have generated a substantial amount of interest in the scientific community. The high chemical stability, mechanical strength and electrical conductivity of single walled (SWCNT) and multiwalled carbon nanotubes (MWCNTs) make the material attractive for industrial applications such as microelectronics, flat panel display, the strengthening of composite materials, hydrogen storage and electrodes for batteries and fuel cells.

2. Discussion of the Prior Art

At present, carbon nanotubes are produced by laser ablation, ablation using an electric arc and chemical vapor deposition. Examples of these method are described in American Scientist 85 (1997) 324–337; Journal of Molecular Catalysts A: Chemical 116 (1997) 397–403; Nature 354 (1991) 56; Nature 358 (1992) 220; Nature 363 (1993) 603; Chemical Phys. Lett. 289 (1998) 602; Appl. Phys. Lett 75 (1999) 367; Carbon 35 (1997) 1495; Published International Patent Applications WO 99/06618, Feb. 11, 1999 and WO 99/25652, May 27, 1999 and U.S. Pat. No. 5,780,101, issued Jul. 14, 1998 and U.S. Pat. No. 5,965,267, issued Oct. 12, 1999.

The first two methods, i.e. laser and electric arc ablation are based on the same principle, namely the evaporation of a graphite rod enriched with a metallic catalyst, and condensation of the vapor thus produced in nanotube form. Such methods, which permit the fabrication of bulk multilayer nanotubes, require large amounts of energy for the evaporation process as opposed to the chemical vapor deposition (CVD) method. In fact, in order to achieve atomic vaporization of one mole of carbon, 717 kJ is required, while with the CVD method 227 kJ is generated by the decomposition of one mole of acetylene molecules. With the CVD method, it is possible to control the area where nanotubes are deposited on a surface [J. Am. Chem. Soc. 121(1999) 10832 and Science 282 (1998) 1105]. The problems associated with the CVD method include low yield and the generation of large quantities of amorphous carbon during pyrolysis of the carbon containing gas.

Applicants' and others previously proposed a process involving the deposition of a metal catalyst such as iron or nickel on carbon paper, and passing a feedstock gas containing a source of carbon over the substrate while applying an electrical current thereto to heat the substrate sufficiently to generate a reaction between the catalyst and the feedstock gas. [see "Growth of Carbon Nanotubes on Ohmically Heated Carbon Paper", Chem. Phys. Lett, Vol 342, No 5–6, p503–509 (2001)]

It has been found that carbon nanotubes produced using the previously proposed process contain a rather large amount of defects, and undesirable amorphous carbon.

GENERAL DESCRIPTION OF THE INVENTION

The object of the present invention is to provide an improved process for producing carbon nanotubes, which are relatively free of defects and amorphous carbon, the new method providing a viable alternative to the chemical vapor deposition method described above.

Accordingly, the present invention relates to a process for producing carbon nanotubes comprising the steps of:

(a) preparing a silane solution of a metallic catalyst;

(b) immersing an electrically conductive substrate in the silane solution to deposit catalyst thereon;

(c) passing a feedstock gas containing a source of carbon through the substrate; and (d) applying an electrical current to the substrate to heat the substrate sufficiently to generate a reaction between the catalyst and the gas resulting in the formation of carbon nanotubes.

BRIEF DESCRIPTION OF THE DRAWINGS

The invention is described below in the accompanying drawings, wherein.

DESCRIPTION OF THE PREFERRED EMBODIMENT

Catalyst Preparation

A dipping solution is prepared by diluting a 50% solution of 2(4-chlorosulfonylphenyl) ethyl trichlorosilane having the formula:

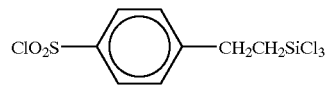

in dichloromethane with water in ethanol solution (6 vol %) to a silane concentration of 0.5 to 3 vol %. After stirring the solution for 2 hours at room temperature, different amounts of catalytic metal salts of cobalt nitrate and nickel nitrate with a 1:1 metal ratio were added to the silane solution to give catalytic concentrations ranging from 0.15 to 1.0M. After further stirring for 30 minutes, carbon papers for use as catalyst supports were immersed in the solution for 10 seconds and dried with filter paper.

It is believed that the principle of the silane procedure is based on the fact that the silane used has three Si—Cl bonds, which react with OH groups on the fiber and with the water to form a silicate monolayer on the fiber which is covalently bonded to the fiber. At the free end of the silane molecule, the sulfonic group ($SO_3H$) is able to replace the hydrogen with any metallic cation. In the present case, the metallic cations are $Co^{2+}$ and $Ni^{2+}$. The result is a monolayer dispersion of cobalt and nickel sulfonates on the fiber.

Synthesis of Nanotubes

Figure 1:
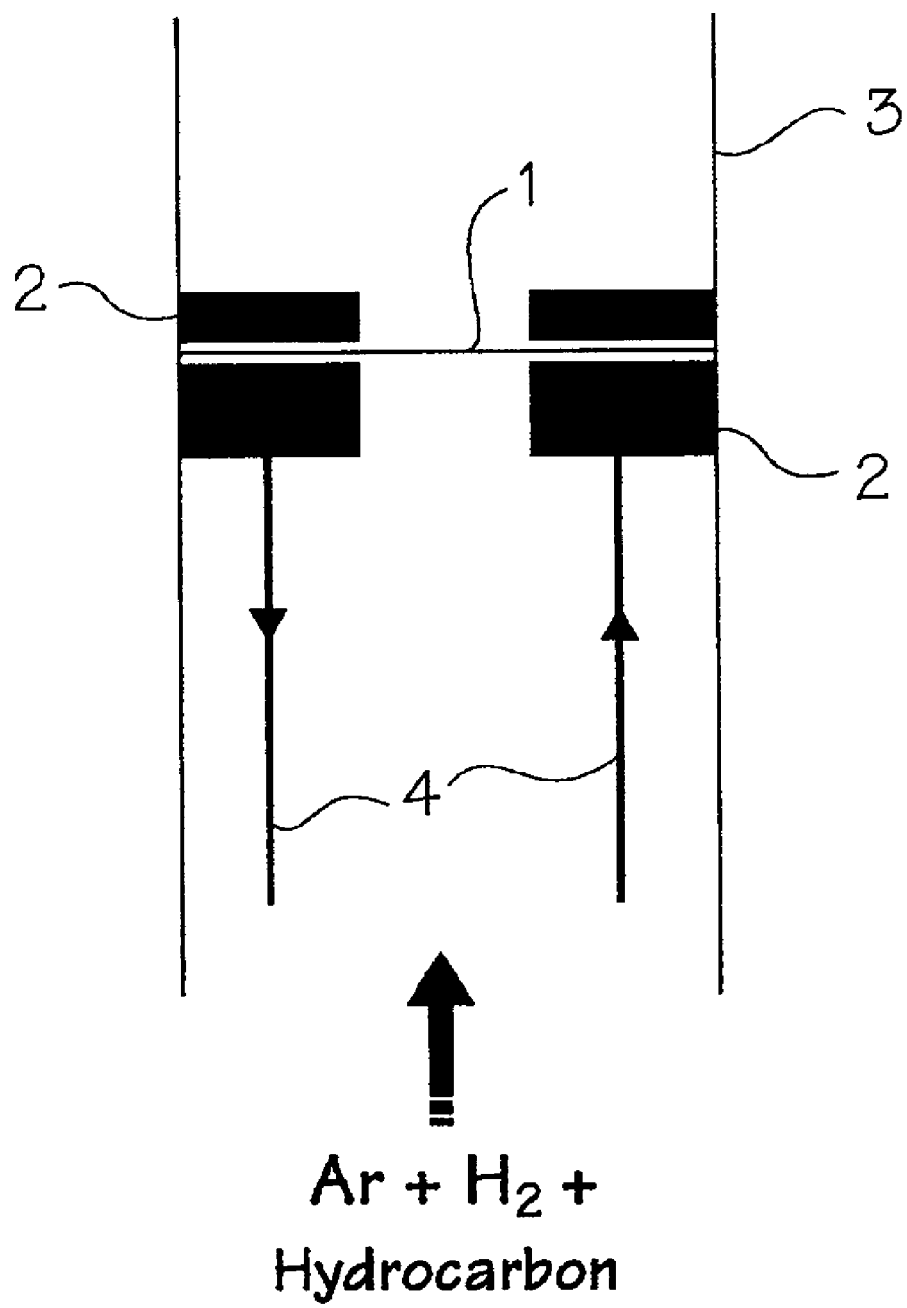
FIG. 1 is a schematic block diagram of an apparatus for carrying out the process of the invention.

Referring to FIG. 1, a substrate defined by a 2.5 cm×3 cm piece of carbon paper 1 carrying the catalyst is placed between two graphite electrodes 2 mounted in a reactor defined by a quartz tube 3, which is 30 cm long and 3.5 cm in diameter. Of course, the dimension of the tube 3 can be scaled up. Stainless steel rods 4 connected to the electrodes 2 supply electrical power to the electrodes for heating the carbon paper 1 by the Joule effect. In this case, the power to the electrodes 2 is 40 to 100 watts. A current of a few amperes (5 to 8 amperes) is sufficient to heat the carbon paper up to 1000° C. in less than one second.

The carbon paper 1 is first heated to 400° C. in an argon atmosphere to decompose the nitrates and produce oxidized metals. A reduction to obtain metal nanoparticles is then carried out in the presence of hydrogen at about 500° C. for 2 to 3 minutes. The paper 1 is then heated to about 800° C. and a gas mixture including 90% Ar, 5% $H_2$ and 5% $C_2H_4$ is fed into the tube 3. The gas mixture is forced to pass through the 1.3 cm×1.3 cm active section of carbon paper 1 before exiting the tube. Multi-wall carbon nanotubes (MWCNTs) are rapidly generated on the carbon paper 1, and their growth stops after about one minute. Finally, the system is cooled under an argon atmosphere.

The above described synthesis can be carried out on a stainless steel mesh instead of carbon paper as the substrate on which to grow the nanotubes. The mesh is formed of stainless steel threads having a diameter of about 30 microns with a spacing of about 30 microns between fibers.

Carbon nanotubes were produced using, as catalysts, the metals Fe, Co and Ni, their binary alloys $Fe_{0.5}Co_{0.5}$, $Fe_{0.5}Ni_{0.5}$ and $Ni_{0.5}Co_{0.5}$, and their ternary alloy $Fe_{0.33}Co_{6.33}Ni_{0.33}$. Other metal ratios may be used, but such a catalysts do not perform as well as those listed above. The gases used include acetylene, ethylene, methane and carbon monoxide.

Purification Procedure

The MWCNTs are purified by removal of the catalyst. Purification is effected using 70% $HNO_3$ to dissolve catalyst particles at the tips of the nanotubes. The nanotubes are kept in the acid for 4 hours and then washed with distilled water. Finally, an ultrasound treatment is effected in distilled water for 10 minutes.

Characterization of Nanotubes

The MWCNTs are characterized with an Hitachi H-9000 NAR high resolution transmission electron microscope (HRTEM) operated at 300 kV and on Hitachi S-4700 scanning electron microscope (SEM) with a field emission gun operating at 15 kV. The samples for the HRTEM are cut directly from the carbon paper.

Results

Figure 2:
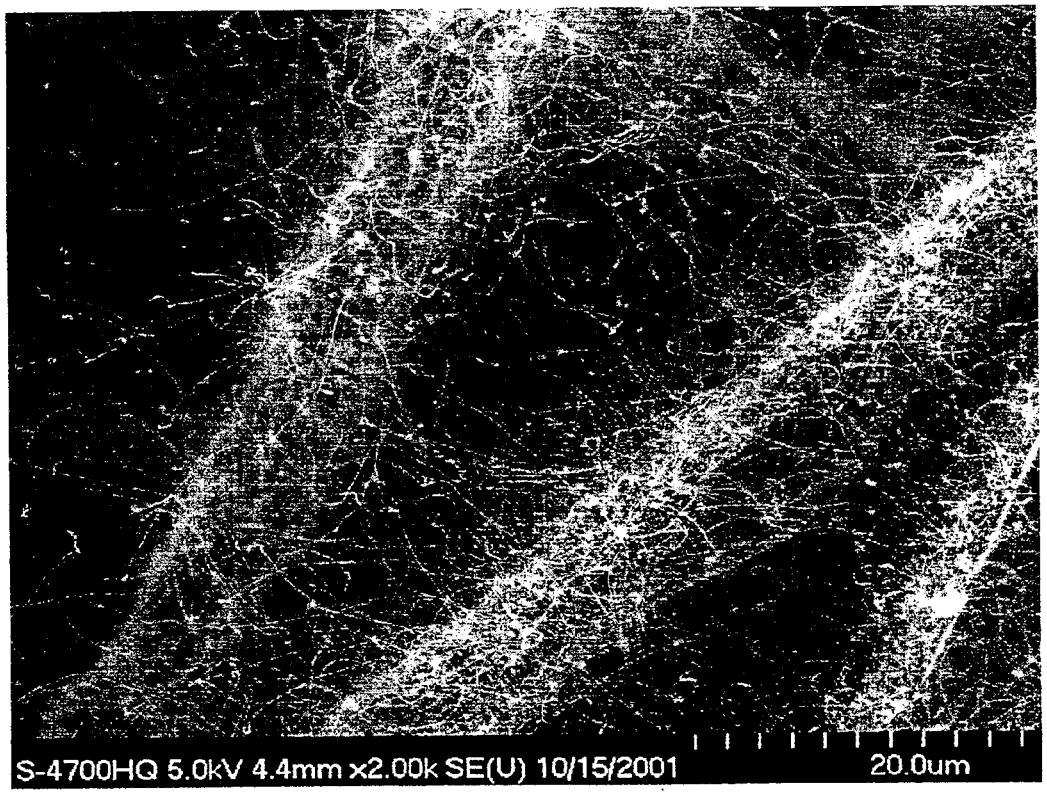
FIGS. 2 and 3 are scanning electron micrographs of typical areas of carbon nanotubes using the method of the present invention.
Figure 3:
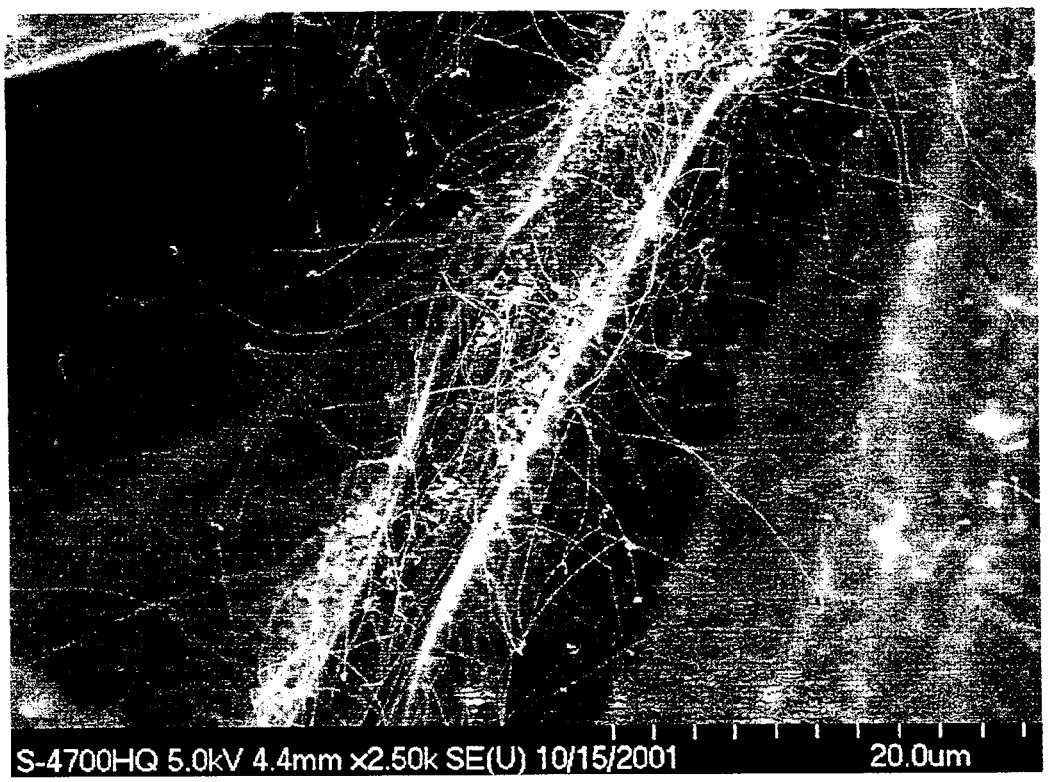

With reference to FIGS. 2 and 3, which show SEM mircrographs of MWCNTs grown on carbon fibers with a 0.6M Ni/Co catalyst in 1% silane solution, it is clearly evident that the tubes are uniformly distributed along the carbon fibers and have a length of 15–20 µm.

Figure 4:
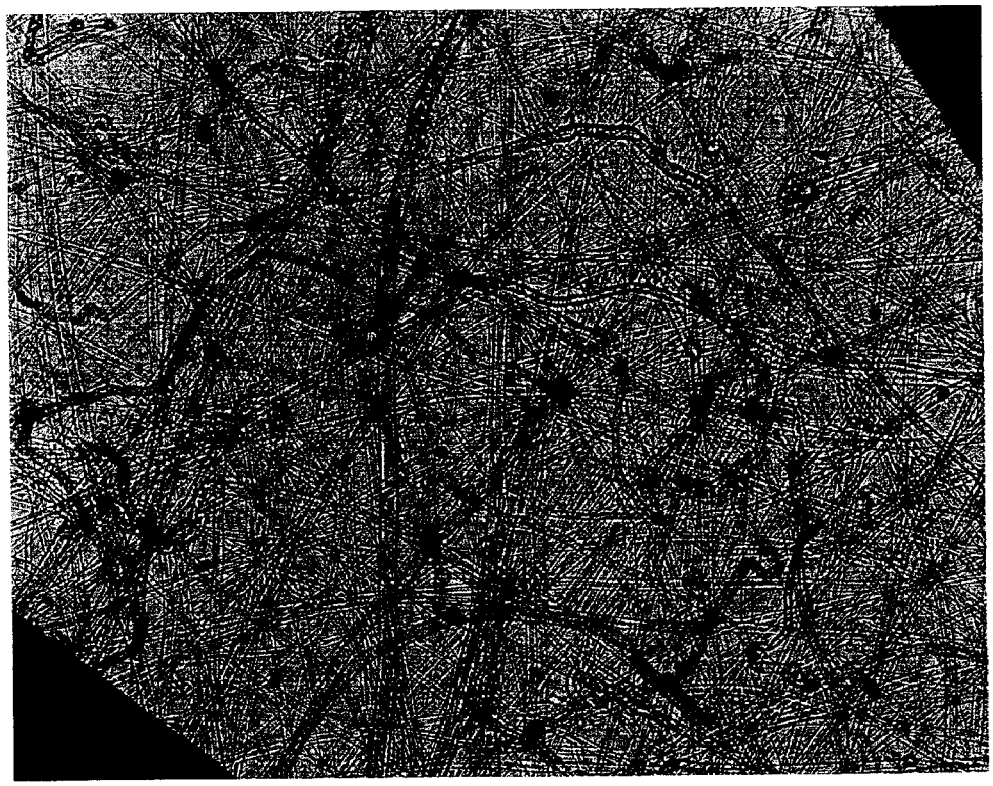
FIGS. 4 and 5 are transmission electron micrographs of the carbon nanotubes.

The quality and microstructure of the tubes is determined using the HRTEM. FIG. 4, which is a TEM micrograph of nanotubes grown on catalyst particles supported by carbon fibers, illustrates a remarkable abundance of individual MWCNTs, which cross each other to form a dense network-like structure. Most of the observed nanotubes are quite straight and very clean. The diameters of the nanotubes range from 30 to 50 nm with relatively large hollows (hollow interiors). The two dark triangles in FIG. 4 are part of two carbon fibers used as supports. The nanotubes could be used as large area electrodes for electrochemical purposes.

Close observation of the nanotubes at high resolution provides detailed information about the structure of the nanotubes. The outer diameter of the nanotubes is nearly 50 nm. The walls of the tubes are approximately 10 nm thick and the tubes consist of approximately 25 individual, cyliridrical, graphitic layers. The interior diameter of the tubes is 30 nm, i.e. approximately three times larger than the wall thickness. Observations in different areas reveal that the nanotube is free of defects and amorphous carbon, either on the outer walls or on the inner walls of the tubes.

Figure 5:
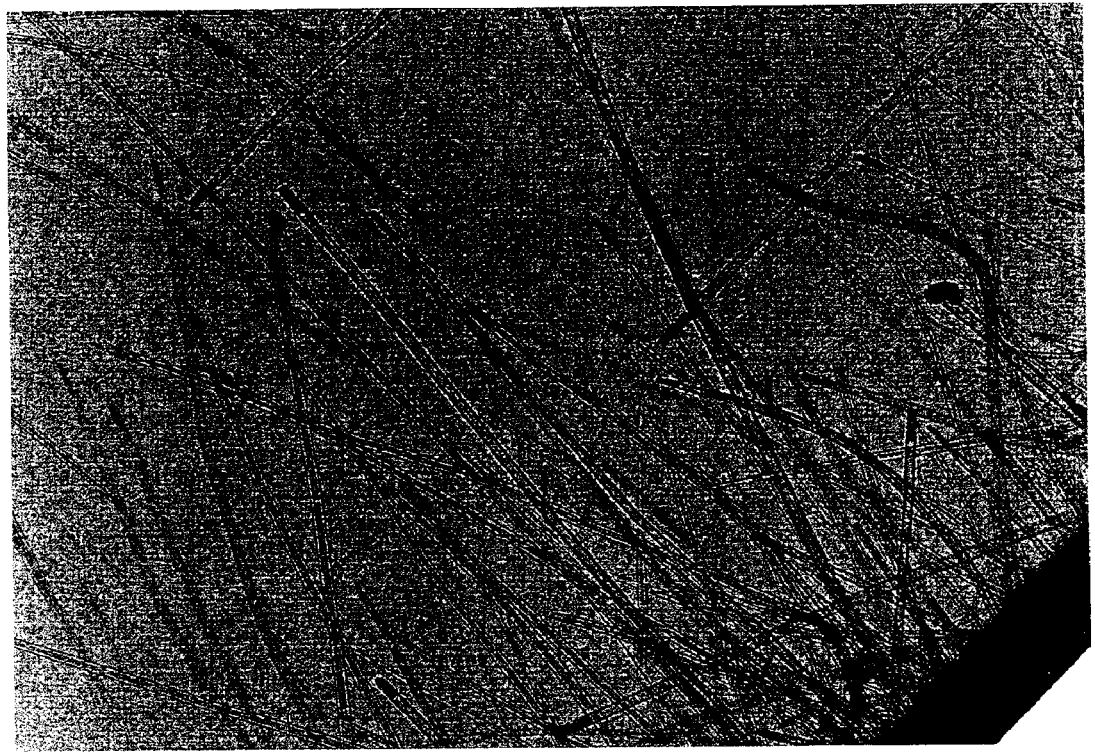
Figure 6:
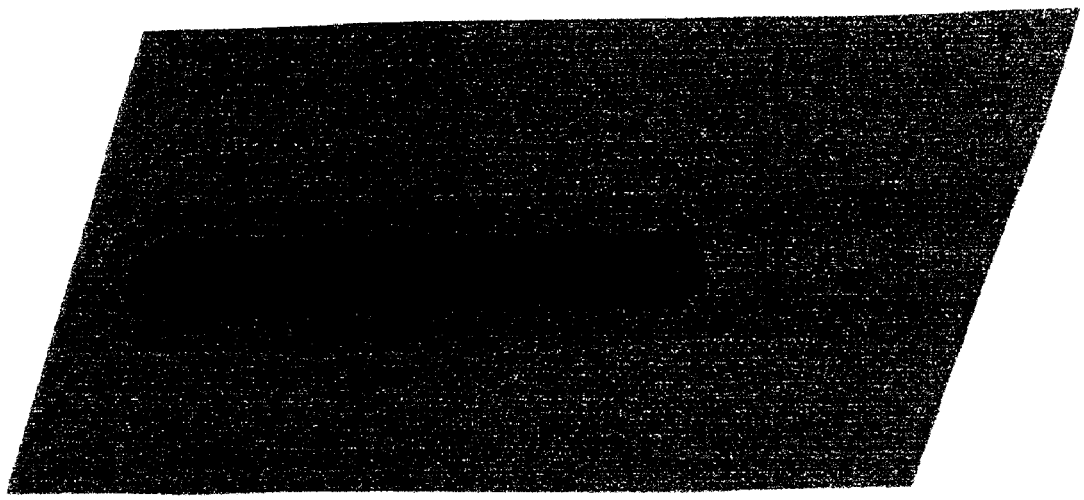
FIGS. 6 to 8 are higher resolution transmission electron micrographs of the nanotubes showing the tip and wall structures of the tubes.
Figure 7:
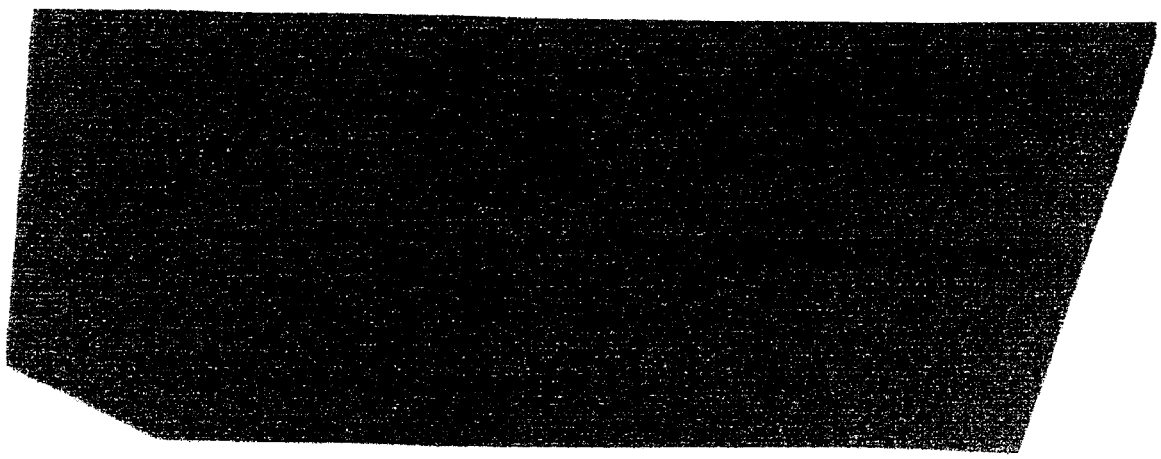
Figure 8:
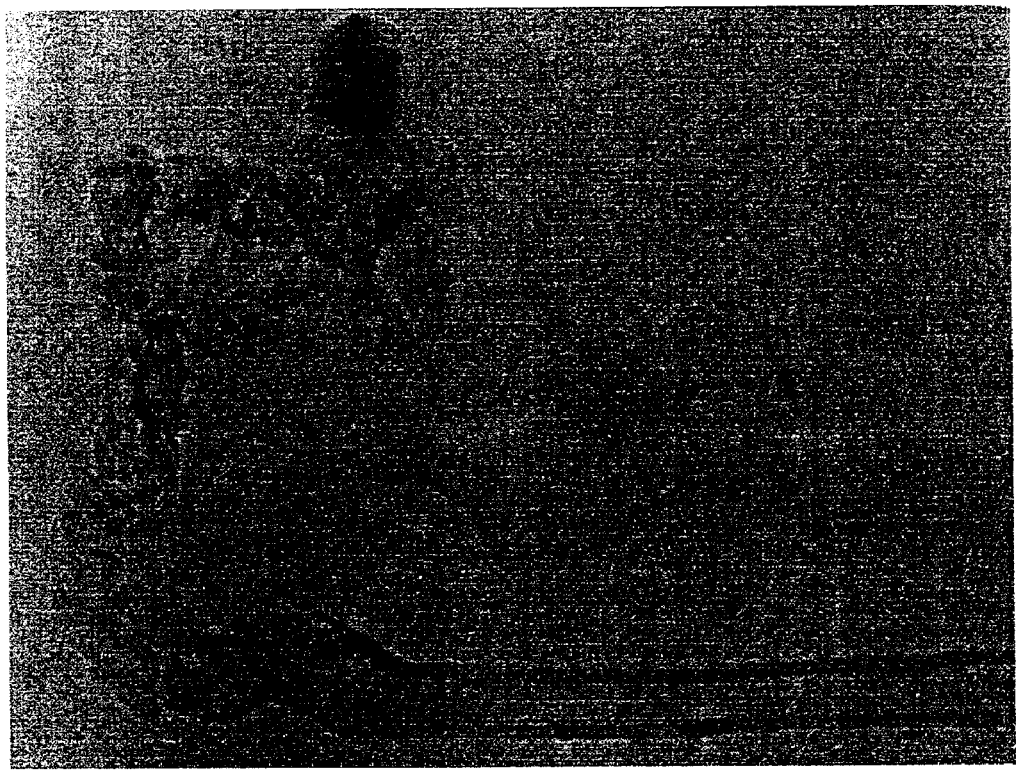

The MWCNTs obtained by the above described method follow a tip-growth mechanism. The tubes display different shapes of catalyst particles at their tips (FIGS. 5 to 7). In FIG. 5, 200–400 nm long rod-like catalyst particles are clearly observed at the tip of the nanotubes. In this case, the diameters of the catalyst particles correspond to those of the interiors of the nanotubes. In some cases, the catalyst particles at the tip of the nanotubes taper to a point (FIG. 7) and have lengths in the range of 300–800 nm. It is evident that the tips of the catalyst particles are quite sharp, and the diameters of the nanotubes depend on the diameter of the bottom of the tapered tips. Usually, the carbon paper substrate is not treated before the silane procedure described above; however, if the carbon paper is left standing in methanol for 15–30 minutes before preparing the catalyst, MWCNTS with a pointed tip predominate. The tubes can be used in field emitting applications. In other cases, normally straight nanotubes suddenly become curved and change their structure at their tips where they become tortuous when the growth temperature suddenly dropped at the end of the growth session. Close observation at a relatively high magnification (FIG. 8) shows that the tortuous part is disordered. The junction between the straight part of the tube and the tortuous part is fragile and the tube may easily break at that point, which is advantageous when open tubes are desired. Moreover, the catalyst material is spherical with a diameter larger than that of straight part of the nanotubes.

Figure 9:
FIG. 9 is a transmission electron micrograph of the nanotubes following purification by tip opening and catalyst dissolution.

As shown in FIG. 9, after purification, most of the catalyst particles (approximately 80%) have been removed to open the nanotubes. Such open tubes can be used for hydrogen storage and heat pumps. Open and closed nanotubes can be used as electrocatalyst supports in fuel cells or other electrochemical applications utilizing carbon-based electrodes.

We claim:

1. A process for producing carbon nanotubes comprising the steps of:
   (a) preparing a halogenated silane solution of a metallic catalyst;
   (b) immersing an electrically conductive substrate in the silane solution to deposit catalyst thereon;
   (c) passing a feedstock gas containing a source of carbon through the substrate; and
   (d) applying an electrical current to the substrate to heat the substrate sufficiently to generate a reaction between the catalyst and the gas resulting in the formation of carbon nanotubes.

2. The process of claim 1, including the step of placing the carbon nanotubes in an acid to remove metal catalyst therefrom.

3. The process of claim 1, wherein the halogenated silane solution is prepared by adding catalytic metal salts to a suitable silane.

4. The process of claim 3, wherein the catalytic metal salts are selected from the group consisting of cobalt nitrate, nickel nitrate, iron nitrate and mixtures thereof, and the halogenated silane is 2(4-chlorosulfonylphenyl) ethyl trichlorosilane, whereby immersing of the substrate in the silane solution produces a silicate layer on the substrate.

5. The process of claim 4, wherein cobalt nitrate and nickel nitrate in 1:1 metal ratio are added to 2(4-chlorosulfonylphenyl) ethyl silane to give a catalytic concentration of 0.15 to 1.0M.

6. The process of claim 5, wherein the 2(4-chlorosulfonylphenyl) ethyl silane is in the form of a 50% solution is dichloromethane, and the silane is diluted with 6 volume % water in ethanol solution to a silane concentration of 0.5 to 3 volume % before the salts are added to the silane solution.

7. The process of claim 1, wherein the substrate is carbon paper.

8. The process of claim 1, wherein the substrate is a stainless steel mesh.

9. The process of claim 4, wherein the acid is nitric acid.

10. The process of claim 4, including the steps of heating the substrate in an inert gas atmosphere to decompose the nitrates and produce an oxidized metal catalyst; passing hydrogen through the heated substrate to yield metal nanoparticles; and passing a gas mixture of an inert gas, hydrogen and the source of carbon through the heated substrate to produce nanotubes.

11. The process of claim 10 wherein the substrate is carbon paper, which is heated first to about 400° C. in an argon atmosphere to decompose the nitrates, then heated to about 500° C. in the presence of hydrogen, and finally heated to about 800° C. in the presence of the gas mixture.

12. The process of claim 11, wherein the source of carbon is ethylene.

13. The process of claim 12, wherein the carbon nanotubes are purified using 70% nitric acid to dissolve catalyst particles.

14. The process of claim 11, wherein the carbon paper is pretreated with methanol to increase the yield of carbon nanotubes with tapered tips.

15. The process of claim 14, wherein the pretreatment is carried out by leaving the carbon paper standing in methanol for 15–30 minutes.

* * * * *